3,006,852
LUBRICATING COMPOSITIONS AND PROCESS OF LUBRICATION UTILIZING CERTAIN POLYOXY-PHENYLENE COMPOUNDS
Emmett R. Barnum and Clarence L. Mahoney, Berkeley, and Karl J. Sax, Orinda, Calif., assignors to Shell Oil Company, a corporation of Delaware
No Drawing. Filed Dec. 9, 1957, Ser. No. 701,285
5 Claims. (Cl. 252—52)

This invention is concerned with a new composition of matter. Moreover, it is directed to a process of lubrication, particularly at high temperatures.

Materials for the lubrication of metallic equipment may be generally divided into lubricants from natural sources, such as mineral lubricating oils and synthetic lubricants designed for specific purposes. Synthetic lubricants are for the most part roughly divisable into those intended for use at high temperatures and another class of materials suitable for the lubrication of metallic parts at relatively low temperatures. With the advent of machines, motors and equipment containing relatively moving metallic surfaces under increasingly stringent temperature conditions, the requirements of lubrication have begun to outmode previously available lubricants. Mineral oils, for example, are subject to oxidation and thermal decomposition at elevated temperatures and become unworkable at relatively low temperatures. Synthetic lubricants designed for operation at low temperatures are either unstable at relatively high operating temperatures or possess physical characteristics such as volatility making their use at elevated temperatures unsuitable except in completely closed pressure systems. Certain materials are known to be stable at relatively high temperatures but possess sensitivity to oxidation or other influences.

Another complicating environment has made the requirements of stability even greater, namely, equipment operating in the presence of ionizing radiation such as occurs in nuclear reactors or in systems subject to beta or gamma radiation as well as X-ray radiation. Many substances otherwise suitable for lubricating purposes fail rapidly when subjected to the influences of ionizing radiation.

It is an object of the present invention to improve the processes of lubrication. It is another object of this invention to provide a new lubricating composition. A further object of this invention comprises the provision of compositions which are resistant to damage by radiation influences. A specific object of the invention comprises the provision of lubricating compositions which are stable under use at high temperatures whether or not oxygen or radiation also constitute part of the operating conditions. Other objects will become apparent during the following disclosure.

Now, in accordance with the present invention, it has been found that compositions having outstanding thermal stability, resistance to oxidation and resistance to radiation damage comprise mixtures of polyphenyl ethers. More specifically, such compositions comprise 10–90% by weight of unsubstituted polyphenyl ethers with 90–10% by weight of polyphenyl ethers substituted with either tertiary butyl or alpha cumyl radicals as the sole substituents as well as mixtures of both of these types of substituted polyphenyl ethers with the unsubstituted ethers. All of the molecules of the mixtures contain from 2–6 phenyl radicals.

In accordance with the invention, it has been found that such mixtures posses a combination of characteristics making their use as lubricants under high temperature conditions outstanding in comparison with other closely related materials as well as with synthetic lubricants having other elements or structures. This outstanding performance is exhibited not only in the presence of extremely high operating temperatures but in the presence of oxygen and of ionizing radiation. While many of the individual species of the three classes of materials considered here are solids at room temperature, this is not considered to be a great disadvantage since the systems in which these compositions are to be used are normally maintained at temperatures sufficient to keep the composition in liquid from either by its inherent temperature or by the installation of suitable heating means. However, the melting point of the compositions which are normally solid at room temperature is substantially decreased by mixing the individual components, the decrease in melting point of the entire composition sometimes being great enough to cause the mixture to become fluid at ordinary room temperatures. Furthermore, the melting points of the individual species is substantially decreased as the individual molecules become more asymmetrical in their configurations.

The simplest member of the unsubstituted polyphenyl ethers, of course, is diphenyl ether. Other suitable variations of this, of course, include diphenoxy benzene, bis (phenoxyphenyl) ether and bis [ (phenoxyphenoxy) phenyl ] ether. These may be the species wherein the oxygen linkages between phenyl radicals are in the ortho, meta, or para positions, the meta derivatives being those having the lowest melting points. Within individual molecules, of course, there may be 1 or more than 1 of the different types of linkages occurring.

Typical species of the substituted polyphenyl ethers to be admixed with the unsubstituted polyphenyl ethers contain from 1 to 6 tertiary butyl groups or alpha cumyl groups per molecule and preferably have an average of 0.25 to 2 tertiary butyl groups per phenyl radical. The tertiary butyl groups may be in the pare position relative to the ether linkages or may be in the ortho or meta positions and the butylated ethers may be a mixture of isomers containing ortho, meta and para positioned tertiary butyl groups or combinations of any two of these. Typical species include 1-(para-tertaiary butyl phenoxy)-4-phenoxy benzene; bis(para-tertiary butyl phenoxy)-benzene; bis(meta-tertiary butyl phenoxy)benzene; 1-(ortho-tertiary butyl phenoxy)-4-phenoxy benzene as well as molecules containing a larger number of phenoxy radicals or a greater proportion of tertiary butyl substituents within the limitations set forth above.

The corresponding alpha cumyl derivatives may be utilized in place of or in addition to the tertiary butyl polyphenyl ethers.

Another suitable type of substituted polyphenyl ether comprises those in which the polyphenyl ether molecules contain an average of at least 0.5 tertiary butyl groups and 0.5 alpha cumyl groups per molecule. Still more preferably this mixed substituent range should be between about 0.75 and 2.5 of each of the substituents per molecule of polyphenyl ether. The polyphenyl ether radicals may be still further modified by the presence of tertiary butyl radicals directly attached to the phenyl radical of an alpha cumyl group.

Suitable species of these molecules are given in the Table I which follows:

TABLE I

[R=H, tertiary butyl, alpha cumyl or a mixture of tertiary butyl and alpha cumyl radicals]

(1)

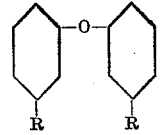

TABLE I—Continued (2) 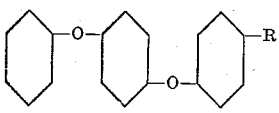

(3) 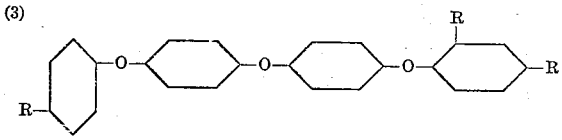

(4) 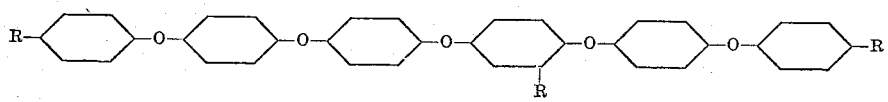

(5) 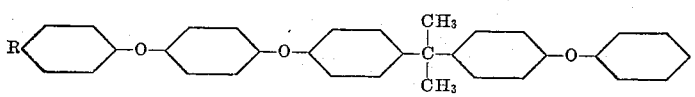

(6) 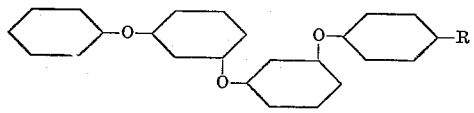

(7) 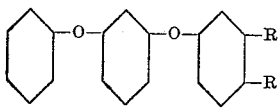

(8) 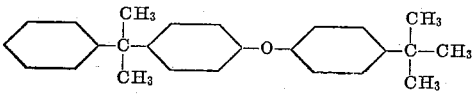

(9) 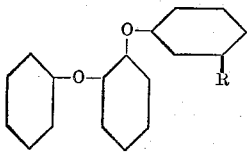

(10) 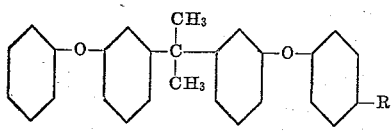

(11) 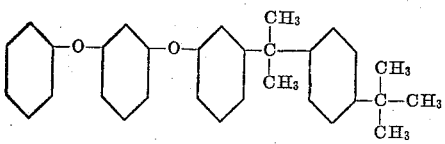

The compositions of the present invention comprise mixtures of 10–90% of unsubstituted polyphenyl ethers containing from 2–6 phenyl radicals per molecule together with 90–10% by weight based on the total composition of the substituted polyphenyl ethers wherein the substituents consist solely of tertiary butyl radicals or alpha cumyl radicals as well as tertiary butyl substituted alpha cumyl radicals. The principal function of the unsubstituted polyphenyl ethers is to provide the composition with outstanding high temperature stability which this class of compounds has been found to exhibit. The substituted polyphenyl ethers as outlined above impart lower melting points and, in mixture with the unsubstituted polyphenyl ethers cause the melting point of the entire composition to be substantially lower than that of the unsubstituted polyphenyl ethers themselves.

The temperatures at which these compositions may be utilized are limited only by the thermal decomposition temperatures of the entire composition but, as shown by data given in the working examples, these are relatively high. For example, the unsubstituted polyphenyl ethers may be utilized at temperatures up to over 800° F. while the tertiary butyl polyphenyl ethers are useful at temperatures to about 770° F. while the alpha cumyl derivatives do not start to decompose until temperatures in the order of 700° or over are attained. Hence, it will be seen that these compositions are particularly useful where many other well-known lubricants decompose. For example, the well-known diester lubricants commence to decompose at temperatures above about 550° F.

Another of the outstanding features of the present compositions comprises their high temperature lubricating properties based not only upon their high temperature stability but also upon their ability to lubricate without causing undue wear. This is emphasized by the data contained in the working examples which shows that the wear caused by these lubricants is of a minor order and is outstanding in excellence as compared with the well-known silicone fluids. The silanes and silicones, notorious for their poor lubricating characteristics are nonetheless useful at high temperatures because of their thermal stability and fluidity. Consequently, one aspect of the present invention comprises dispersal of the compositions claimed herewith in a silane or silicone fluid so as to obtain a composition which is liquid at ordinary room temperatures or slightly thereabove. Such compositions may comprise the mixture of polyphenyl ethers and their derivatives as claimed together with 0.1–2.0 volumes of silicone fluid (or silane) per volume of the claimed compositions. The silicone fluids are those well known in the art and include the dimethyl silicones, the methyl phenyl silicones, the chloro phenyl methyl silicones and the like. Suitable commercially available species are known by the trade name of Dow Corning fluids. In place of or in addition to the silicones other thermally stable materials useful for reducing the pour point of the compositions comprise the silicates and claimed cmopositions. The silicone fluids are those disclosed in U. S. Patent 2,641,581 to Da Fano.

The oxidation stability of the unsubstituted polyphenyl ethers and their tertiary butyl, alpha cumyl and tertiary butyl substituted alpha cumyl derivatives are outstanding in comparison with other substituted polyphenyl ethers as shown by data contained in the working examples. The most stable of these materials comprises the unsubstituted polyphenyl ethers. However, the tertiary butyl and alpha cumyl substituted materials are likewise of surprisingly superior stability as compared with polyphenyl ethers containing methyl substituents or substituents in which non-tertiary carbon atoms are directly attached to a phenyl radical. Likewise, these compounds are of outstanding stability as compared with polyphenyl ether substituents such as methoxy. These differences in properties have been demonstrated by use of the well-known Dornte oxidation test operated at 400 to 500° F. during oxygen adsorption in the presence of a copper catalyst.

Several methods of preparation may be employed for the production of species and mixtures of species useful in these compositions. The well-known Ullmann synthesis may be utilized as described and referred to in "Synthetic Organic Chemistry," by Wagner and Zook, John Wiley and Sons (1953), page 227, and the literature references cited there. Briefly, the Ullmann synthesis comprises heating an alkali metal (potassium) salt of a phenol with an aryl halide or polyhalide (bromide) in the presence of a catalyst (copper) at temperatures in the order of 200–300° C. for 0.5–10 (preferably 1–5) hours, pouring the hot mixture into a solvent such as toluene or xylene, filtering the insoluble alkali metal halide, washing with aqueous caustic to remove excess phenol and removing solvent by distillation or evaporation to isolate the polyphenyl ether or its suitable derivative. Normally, the alkali metal salt of the phenol is used in a 5–10% equivalent excess over the aryl dihalide and about 0.5 to 20 grams of copper catalyst per 1½ moles of the phenol salt is usually employed.

Highly desirable mixtures of the designated types of substituted phenols can be produced by alkylation of unsubstituted polyphenyl ethers with either isobutylene or alpha methyl styrene as well as tertiary butylated alpha methyl styrene. Such addition reacitons are conducted in the presence of a catalyst such as sulfuric acid, $BF_3$-ether complex or para toluenesulfonic acid. The catalyst is employed in an amount between about 0.5 and 5% by weight based on the reaction mixture and the reaction is conducted for a time between about 15 minutes and 12 hours at a temperature between about −15 and +25° C. Usually, particularly at the lower temperatures, an inert solvent such as methylene chloride or xylenes is utilized to produce an easily stirred reaction mixture, 100–1000 cc. of the solvent per mole of polyphenyl ether being employed for this purpose. Following the reaction period the acid is neutralized by warming with potassium or sodium hydroxides, the base layer being separated and the solvent being distilled off to obtain the substituted ether. It is preferred that a hot potassium hydroxide (or sodium hydroxide) wash be used to break up any sulfate esters which may be formed. Between about 1 and 15 moles of the substituted styrene or isobutylene are employed per mole of ether to result in a reaction product containing from about 0.5 to about 2 substitutents per phenoxy radical.

This reaction results in a complex mixture of derivatives having the lowest possible melting point or freezing point and thus imparting optimum lubricating characteristics so that lubrication can be conducted at lower temperatures without the aid of auxiliary heating of the lubricating system. Still greater mixtures may be obtained by using a mixture of ortho meta and para aryl dihalides together with a mixture of the alkali metal salts of phenols in the Ullmann synthesis referred to hereinbefore. Of course, it is possible to employ either a single phenol or a single dihalide, the remaining reaction component being a mixture so as to obtain products having a multiplicity of isomers in order to obtain products of the lowest possible melting points.

It is possible to prepare the compositions of the present invention when alkylating with the use of alpha methyl styrene, its tertiary butylated derivative or with isobutylene by utilizing an excess of unsubstituted polyphenyl ether in a proportion sufficient to produce a reaction product having an excess of the unsubstituted polyphenyl ether remaining so that the compositions of the present invention are obtained in situ. Otherwise, it is possible to combine individual mixtures of species to arrive at the compositions now being claimed.

Where certain conditions are met such as with respect to temperature of operation and other conditions, it is possible that a single specie may be employed or that a mixture of isomers of one of the species may be utilized. For example, where the temperature is sufficiently high or when suitable type of heaters are installed in the lubricating system, it is possible to utilize unsubstituted polyphenyl ethers and it may be preferable to do so, since these have substantially greater thermal stability and resistance to oxidation than the tertiary butyl or alpha cumyl substituted ethers. On the other hand, particularly where mixtures of the tertiary butyl, alpha cumyl, tertiary butylated alpha cumyl or mixed butyl and cumyl derivatives are prepared so as to obtain lower pour points or melting points and the temperature to be expected during utilization is no higher than about 700° F., it is then possible to employ such mixtures in the absence of the unsubstituted polyphenyl ethers.

It is also possible to employ polyphenyl ethers in which one or more of the ether linkages have been replaced by a dimethyl silyl group particularly in situations where lubricating qualities are of minor importance since such derivatives have especially high stability particularly at temperatures in excess of 450° F. The corresponding sulfur or seleno ethers may be utilized especially when extreme pressure properties are desired.

It is possible to employ these materials either as individual species, mixtures of species or compositions according to those claimed for purposes other than lubrication. They may be utilized, for example, as heat transfer media, as radiation moderators, as part of a radiation shielding composition or as hydraulic fluid compositions where the temperatures are sufficient to maintain the composition at the desired consistency.

One specialized use of the ethers particularly those having relatively high melting points comprises admixture therewith of powdered or granulated lead for the purpose of preparing structures which are moldable and will perform highly effectively as moderator-shield devices for radiation-emitting equipment or material. It has been found that shaped pieces comprising 50–90% by weight of the claimed mixture of ethers together with 10–50% of granulated lead perform efficiently and at lower cost as radiation shield elements than a corresponding shield made from continuous lead structures. Likewise, the total weight of the structure is reduced. Such structures may take form of bricks, plates or paper impregnated wrappers which may be employed for the shielding and reflection of containers for radioactive sources. These are especially useful where the temperatures are such that the structure remains in essentially solid or plastic condition. However, if the temperatures are elevated to such an extent that the polyphenyl ethers or their derivatives are in liquid form, it is possible to maintain the composition containing the granulated lead in a state of agitation sufficient to provide an essentially uniform composition throughout the shielding area.

The following compositions illustrate various embodiments of the present invention and indicate the possibilities for obtaining compositions useful not only as high temperature lubricants which are resistant to ionizing radiation influences but also compositions useful in greases and in radiation reflector structures.

Composition A:
   10% bis(penoxyphenyl)ether
   90% mixed bis(tert-butylphenyl)ethers
Composition B:
   60% phenyl phenoxyphenyl ether
   40% mixed bis(alphacumylphenyl)ethers
Composition C:
   80% mixed meta and para-polyphenyl ethers, averaging 4 phenyl radicals per molecule
   20% 1-(p-alphacumylphenoxy)-4-tert-butylphenoxy-benzene
Composition D:
   50% Composition B
   50% methyl phenyl silicone fluid
Composition E (radiation reflector composition):
   80% Composition A
   20% granulated lead Composition F:
    40% mixed phenoxyphenyl phenyl ethers
    60% mixed alphacumyl tert-butylphenoxyphenyl ethers When Composition B from the above list of compositions is utilized as a bearing lubricant at temperatures between about 400 and 750° F., satisfactory lubrication of the bearing is experienced for an extended period of operation of the bearing. If, however, a composition is prepared by using methyl substituted polyphenyl ethers in place of the alpha cumyl phenyl ethers, it is found that bearing lubrication becomes unsatisfactory due to coke formation, lacquer formation and lack of proper oxidation stability. The life of the bearing utilizing the latter composition is substantially shorter than when employing Composition B.

In illustrating the stability of the present materials the following Table II presents data relative to coke formation of the individual components as compared with methyl substituted polyphenyl ethers or methoxy substituted polyphenyl ethers. The coking test is conducted in a small-scale panel coke apparatus by subjecting 5 grams of the oil for one hour to the influence of oxidation and thermal decomposition. The small-scale apparatus uses only a small amount of oil yet gives relative ratings of coking tendencies similar to those obtained with the MIL-L-7808 Model C coking apparatus used in evaluation of jet engine lubricants. In the small-scale test, oil is splashed on a heated aluminum panel in the presence of air. A description of the apparatus and the procedure used in the small-scale panel coke test are contained in Wright Air Development Center Technical Report 57–177. At the end of the test the amount of deposits on the panel are measured. The lower the amount of deposit the smaller the amount of coke formed under the conditions employed. Table II shows that the unsubstituted polyphenyl ethers are outstandingly stable in this test and that the tertiary butyl substituted or alpha cumyl substituted polyphenyl ethers are only slightly less stable. However, the polyphenyl ethers containing methyl or methoxy substituents show sharply higher rates of coke formation.

TABLE II

Panel coke stability

[5 g. oil, 1 hr., air rate through vapor space 2 l./hr.]

| Compound | Mg. deposit, panel temp. °F. | |
|---|---|---|
| | 700 | 800 |
| Bis(p-phenoxyphenyl)ether | 1.5 | 2.3 |
| 1-(O-phenylphenoxy)-4-phenoxybenzene | 0.5 | 4.7 |
| Bis[p-(m-methoxyphenoxy)phenyl]ether | 6.4 | 42.2 |
| Mixed methyl substituted polyphenyl ethers | 14.4 | 36.7 |
| 1-(p-tert-Butylphenoxy)-4-phenoxybenzene | 1.7 | 6.5 |
| 1-(p-α-Cumylphenoxy)-4-phenoxybenzene | 0.6 | 5.2 |
| 1-(p-α-Cumylphenoxy)-4-methoxybenzene | 2.3 | 29.3 |
| Di-2-ethylhexyl sebacate jet-engine lubricant) containing anti-oxidants | 35.2 | 37.0 |

The thermal stability of the compounds coming within the claims as compared with other potential high temperature lubricants was tested by means of an isoteniscope. With the isoteniscope, the vapor pressure of a compound can be measured, while it is being slowly heated in absence of air. The temperature at which thermal decomposition occurs can be indicated by the rapid increase in vapor pressure resulting from the formation of volatile molecular fragments.

Table III indicates that the three classes of materials coming within the scope of the claims are substantially more stable than other materials previously known and used as potential high temperature lubricants. The unsubstituted polyphenyl ethers are outstanding in their thermal stability while the tertiary butyl derivatives were stable up to temperatures in the order of 772° F. However methyl substituted polyphenyl ethers were substantially less stable and the aliphatic diesters such as the sebacate or the silicone fluids started to decompose at substantially lower temperatures.

TABLE III

Initial thermal decomposition temperatures (isoteniscope data)

| Compound: | °F. |
|---|---|
| Di-2-ethylhexyl sebacate | 575 |
| Methylphenyl silicone | 590 |
| Bis(p-phenoxyphenyl)ether | 836 |
| Bis[p-(p-phenoxyphenoxy)phenyl]ether | 773 |
| Bis[p-(p-tert-butylphenoxy)phenyl]ether | 772 |
| 1-(p-α-cumylphenoxy)-4-phenoxybenzene | approx. 700 |

In order to indicate the resistance of the subject classes of polyphenyl ethers and their derivatives to oxidation at elevated temperatures, a modified Dornte test was performed, the test being conducted at 400 and 450° F. Table IV shows the effect of the substituent upon the stability of the polyphenyl ether under these conditions. Again, it will be seen from the data contained in Table IV that the presence of methyl or methoxyl substituents resulted in low oxidation stability while the unsubstituted, tertiary butyl substituted or alpha cumyl substituted derivatives were outstanding in oxidation stability under the conditions of the test.

TABLE IV

Relative stability of polyphenyl ethers, Dornte Oxidation test

| Parent compound R—⟨⟩—O—⟨⟩—O—⟨⟩—O—⟨⟩—R | Time to absorb 0.5 mole O$_2$/500 g. of compound, hours at— | |
|---|---|---|
| Substituent R | 400° F. | 450° F. |
| H | 400 | 268 |
| Tert-butyl | 350 | 97 |
| Alpha-cumyl | 200 | 80 |
| CH$_3$—CH$_2$—C(CH$_3$)(CH$_3$)— | 60 | 10 |
| CH$_3$— | 5 | 1.5 |
| CH$_3$—(CH$_2$)$_x$—C(CH$_3$)(H)— | 5 | |
| CH$_3$O— | | 36 |

NOTE.—Circulated oxygen, copper wire catalyst, 1 cm.$^2$/g. oil.

In order to indicate the stability of the subject class of materials to ionizing radiation samples of the materials were subjected to a cobalt 60 gamma ray source at a temperature of 400° F. in a nitrogen atmosphere. Table V indicates that the materials utilized in the present compositions were exceptionally stable under these conditions and show a high resistance to degradation in the presence of ionizing radiation.

TABLE V

*Radiation changes in synthetic aromatic compounds*

[Irradiated at 400° F., in a nitrogen atmosphere, Co 60 γ-rays]

| Oil | Radiation conditions | | Viscosity, cs. | | | Viscosity increase, percent | | | Acid neut. number, mg. KOH/g. | Evap.[1] 500° F. percent loss | Flash point[2] °F. | Fire point, °F. | Panel coke[3] mg. |
|---|---|---|---|---|---|---|---|---|---|---|---|---|---|
| | Dose, rad. | Time, hr. | 210° F. | 300° F. | 400° F. | 210° F. | 300° F. | 400° F. | | | | | |
| Bis(p-phenoxyphenyl)ether | 0 | | | 2.86 | 1.37 | | | | | 21.7 | 516 | 585 | 1.5 |
| Do | 6.3×10⁷ | 363 | | 2.93 | 1.54 | | 2 | 12 | | 21.8 | 498 | 560 | 4.9 |
| Do | 1.04×10⁸ | 595 | | 3.13 | 1.67 | | 9 | 21 | | | | | |
| Bis[p-(p-tert-butylphenoxy)phenyl]ether | 0 | | 31.4 | | 3.17 | | | | | 3.4 | 572 | 656 | 0.6 |
| Do | 6.3×10⁷ | 363 | 32.6 | | 3.17 | 4 | | 0 | | 4.0 | 526 | 635 | 2.4 |
| Do | 1.04×10⁸ | 595 | 34.0 | | 3.51 | 8 | | 14 | 0.32 | | | | |
| Bis[p-(p-α-cumylphenoxy)phenyl]ether | 0 | | 116 | | 6.40 | | | | | 1.2 | 688 | | 0.2 |
| Do | 6.3×10⁷ | 363 | 123 | | 6.38 | 6 | | 0 | | 2.0 | 635 | >700 | 2.4 |
| Do | 1.04×10⁸ | 595 | 124 | | 7.04 | 7 | | 10 | 0.4 | | | | |
| Di-2-ethylhexyl sebacate | 0 | | 3.26 | | | | | | 0 | | | | |
| Do | 6.3×10⁷ | 363 | 3.82 | | | 17 | | | 10.9 | | | | |

[1] Small-scale evaporation test. Results agree well with full-scale test.
[2] Small-scale flash point test. Results agree well with full-scale test.
[3] Small-scale panel coke test—700° F. panel temperature, 400° F. sump temperature, 1 hr., 2 1/ hr. air circulated through vapor space.

TABLE VI

*Effect of radiation during oxidation-corrosion tests on the stability of various polyphenyl ether derivatives*

| Oil | Bis(p-phenoxyphenyl)ether | | | | Bis[p-(p-α-cumylphenoxy)phenyl]ether | | | |
|---|---|---|---|---|---|---|---|---|
| Test temperature, °F | 450 | | 475 | | 450 | | 475 | |
| Test time, hr | 48 | | 51 | | 48 | | 51 | |
| Radiation rate during test, rad./hr | None | 1.50×10⁵ | None | 2.04×10⁵ | None | 1.96×10⁵ | None | 1.96×10⁵ |
| Properties before oxidation test: | | | | | | | | |
| Viscosity, cs., 210° F | | | | | 116 | 116 | 116 | 116 |
| Viscosity, cs., 300° F | 2.83 | 2.83 | 2.83 | 2.83 | | | | |
| Viscosity, cs., 400° F | 1.37 | 1.37 | 1.37 | 1.37 | 6.40 | 6.40 | 6.40 | 6.40 |
| Oxidation-corrosion test results:[a] | | | | | | | | |
| Viscosity after test, cs., 210° F | | | | | 198 | 221 | 208 | 318 |
| Viscosity after test, cs., 300° F | 2.90 | 2.95 | 2.88 | 2.96 | | | | |
| Viscosity after test, cs., 400° F | 1.62 | 1.56 | 1.60 | 1.55 | 9.06 | 8.96 | 9.28 | 10.6 |
| Viscosity increase, percent at 210° F | | | | | 71 | 90 | 78 | 170 |
| Viscosity increase, percent at 300° F | 2.5 | 4.5 | 2 | 4 | | | | |
| Viscosity increase, percent at 400° F | 18 | 13 | 17 | 13 | 40 | 40 | 45 | 65 |
| Acid neut. number, mg. KOH/g. | 0.40 | 0.61 | 0 | 0.94 | 0.7 | 1.5 | 0.89 | 1.5 |
| Metal weight loss, mg./cm.², Cu | 0.23 | 0.40 | +0.06 | 0 | 0.18 | 1.45 | 2.83 | 2.85 |
| Metal weight loss, mg./cm.², Mg | +0.08 | 0 | +0.05 | +0.09 | 0.17 | +0.15 | 0.17 | 0.18 |
| Metal weight loss, mg./cm.², Fe | +0.11 | +0.08 | 0 | 0.06 | 0 | +0.05 | 0 | 0.26 |
| Metal weight loss, mg./cm.², Ag | +0.06 | 0.17 | +0.09 | +0.08 | 0 | 0.08 | 0.05 | 0.15 |
| Metal weight loss, mg./cm.², Al | 0.08 | 0.05 | 0 | 0.08 | 0.22 | +0.03 | 0 | 0.15 |
| Metal weight loss, mg./cm.², Ti | 0.25 | +0.09 | 0 | 0.17 | 0.09 | 0.14 | 0.17 | 0.12 |
| Deposits | None | None | None | None | None | None | None | None |

[a] Small-scale test, 5 g. sample, 200 ml. air/hr.

Tests were conducted to determine the oxidation-corrosion characteristics of the subject materials while they were being subjected also to ionizing radiation. Table VI indicates the stability of several typical materials coming within the scope of components used in the composition of the invention when the ionizing radiation source was Co 60 gamma rays.

Since many substances may be stable at high temperatures and in the presence of oxygen, it was necessary to ascertain whether or not the compounds utilized in the compositions of this invention also possess satisfactory lubrication characteritics. These were measured by means of the standard four-ball wear test operated at 400° F. for one hour at 600 r.p.m. utilizing ½" diameter 52–100 steel balls. Table VII indicates that the wear characteristics of the subject classes of polyphenyl ethers and their derivatives were satisfactory in this respect.

TABLE VII

*Four-ball wear test results*

[400° F., 1 hr, 600 r.p.m., ½" diam. 52-100 steel balls]

| Oil | Wear scar diameter, mm., load, kg. | | | | | | | | |
|---|---|---|---|---|---|---|---|---|---|
| | 1 | 2 | 5 | 10 | 15 | 20 | 30 | 40 | 50 |
| Bis(p-phenoxyphenyl)ether | 0.36 | 0.40 | 0.55 | 0.75 | 0.99 | 1.00 | | 1.20 | 1.31 |
| Bis[p-(p-tert-butylphenoxy)-phenyl] ether | | 0.39 | 0.48 | 0.50 | | 0.63 | 0.75 | 0.83 | 0.89 |
| Meta-bis(para-alpha-cumyl-phenoxy)benzene | | | | 0.52 | | 0.67 | | 0.88 | |
| Petroleum white oil | | 0.25 | 0.32 | 0.53 | 0.78 | 0.93 | 0.94 | 0.97 | |
| m-Terphenyl | 0.34 | 1.05 | 2.57 | 2.9 | | | | | |
| Silicone fluid—DC 710 | 1.11 | 2.14 | 2.35 | 3.06 | | | | | |

We claim as our invention:

1. A composition consisting essentially of 10–90% by weight of unsubstituted polyoxyphenylene compounds having the general formula $R-O-[R-O]_n-R$ wherein R is a phenylene radical and $n$ is an integer from 1 to 4, and 90–10% by weight of substituted polyoxyphenylene compounds of the same general structure wherein the phenylene radicals are substituted with substituents of the class consisting of tertiary butyl radicals and alpha cumyl radicals, the substituted and unsubstituted polyoxyphenylene compounds having from 3 to 6 phenylene radicals per molecule.

2. The composition of claim 1 wherein the substituted polyoxyphenylene compound comprises phenylene groups substituted with 1–6 tertiary butyl groups per molecule, each phenylene radical of said compound bearing an average of 0.5–2 tertiary butyl groups.

3. The composition of claim 1 wherein the substituted polyoxyphenylene compound comprises phenylene groups substituted with 1–4 alpha cumyl radicals per molecule, each phenylene radical of said compound bearing an average of 0.5–2 alpha cumyl radicals.

4. The process which comprises transmitting power by means of the composition of claim 1.

5. The method for effecting the transfer of heat which comprises bringing into heat exchange relationship with another material the composition of claim 1.

References Cited in the file of this patent

UNITED STATES PATENTS

| | | |
|---|---|---|
| 1,874,258 | Dow | Aug. 30, 1932 |
| 2,079,783 | Wiezevich | May 11, 1937 |
| 2,095,619 | Stoesser | Oct. 12, 1937 |
| 2,128,109 | Wiezevich | Aug. 23, 1938 |
| 2,149,789 | Rittler | Mar. 7, 1939 |
| 2,239,515 | Bartlett | Apr. 22, 1941 |